US010446095B2

(12) United States Patent
Zhao

(10) Patent No.: US 10,446,095 B2
(45) Date of Patent: Oct. 15, 2019

(54) IMAGE PROCESSING METHOD OF DISPLAY DEVICE, IMAGE PROCESSING STRUCTURE, AND DISPLAY DEVICE

(71) Applicants: HKC Corporation Limited, Shenzhen, Guangdong (CN); Chongqing HKC Optoelectronics Technology Co., Limited, Chongqing (CN)

(72) Inventor: Wenqin Zhao, Chongqing (CN)

(73) Assignees: HKC CORPORATION LIMITIED, Shenzhen, Guangdong (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 117 days.

(21) Appl. No.: 15/580,306

(22) PCT Filed: Sep. 19, 2017

(86) PCT No.: PCT/CN2017/102229
§ 371 (c)(1),
(2) Date: Dec. 7, 2017

(87) PCT Pub. No.: WO2019/041397
PCT Pub. Date: Mar. 7, 2019

(65) Prior Publication Data
US 2019/0221174 A1    Jul. 18, 2019

(30) Foreign Application Priority Data

Aug. 28, 2017  (CN) .......................... 2017 1 0750895

(51) Int. Cl.
*G09G 3/36*    (2006.01)

(52) U.S. Cl.
CPC ..... *G09G 3/3607* (2013.01); *G09G 2320/028* (2013.01); *G09G 2320/0242* (2013.01);
(Continued)

(58) Field of Classification Search
CPC combination set(s) only.
See application file for complete search history.

(56) References Cited

U.S. PATENT DOCUMENTS 8,228,348 B2 * 7/2012 Kimpe ................. G09G 3/2092
345/690
2009/0160747 A1 * 6/2009 Morisue ............... G09G 3/3406
345/88

(Continued)

FOREIGN PATENT DOCUMENTS

CN    102903342 A    1/2013
CN    102956218 A    3/2013
(Continued)

OTHER PUBLICATIONS

International Search Report dated May 4, 2018, in the corresponding PCT application PCT/CN2017/102229, 9 pages in Chinese.

*Primary Examiner* — Ryan M Gray
(74) *Attorney, Agent, or Firm* — Juan Carlos A. Marquez; Marguez IP Law Office, PLLC

(57) ABSTRACT

This application relates to an image processing method of a display device, The method includes: dividing a picture of a display device into several main pixel blocks and several sub pixel blocks; adjusting white dot coordinates by using a gamma module; obtaining a high-voltage grayscale lookup table by using a high-voltage gamma module and obtaining a low-voltage grayscale lookup table by using a low-voltage gamma module; selecting to output the high-voltage grayscale lookup table or the low-voltage grayscale lookup table by using a first selection module; calculating a color saturation of the picture of the display device by using a color
(Continued)

saturation calculation module; and adjusting, by a second selection module, a chromatic visible angle value in the display device according to the color saturation and the white dot coordinates, the high-voltage grayscale lookup table or the low-voltage grayscale lookup table.

15 Claims, 5 Drawing Sheets

(52) U.S. Cl.
CPC .............. *G09G 2320/0666* (2013.01); *G09G 2320/0673* (2013.01); *G09G 2360/16* (2013.01)

(56) References Cited

U.S. PATENT DOCUMENTS

| | | | | |
|---|---|---|---|---|
| 2010/0156774 | A1* | 6/2010 | Broughton | G09G 3/2018 345/88 |
| 2011/0134160 | A1 | 6/2011 | Okishiro et al. | |
| 2011/0261093 | A1* | 10/2011 | Broughton | G09G 3/2018 345/694 |
| 2012/0013635 | A1* | 1/2012 | Beeman | G09G 3/2003 345/590 |
| 2012/0016472 | A1* | 1/2012 | Chen | G09B 21/003 623/4.1 |
| 2014/0160177 | A1* | 6/2014 | Smith | G09G 3/3659 345/690 |
| 2014/0210878 | A1* | 7/2014 | Broughton | G09G 3/003 345/694 |
| 2015/0097880 | A1* | 4/2015 | Ooga | G09G 3/3406 345/694 |

FOREIGN PATENT DOCUMENTS

| | | |
|---|---|---|
| CN | 104021760 A | 9/2014 |
| CN | 104952410 A | 9/2015 |
| CN | 106297728 A | 1/2017 |
| JP | 2009053589 A | 3/2009 |

* cited by examiner

IMAGE PROCESSING METHOD OF DISPLAY DEVICE, IMAGE PROCESSING STRUCTURE, AND DISPLAY DEVICE

BACKGROUND

Technical Field

This application relates to the display field, and in particular, to an image processing method of a display device, an image processing structure, and a display device.

Related Art

Currently, an image processing technology is to divide a display area of a liquid crystal panel into many pixels, and each pixel has three primary colors: red, green, and blue. All colors of visible light can be generated by mixing red (R) light, green (G) light, and blue (B) light, so that a color to be presented by a pixel may be created by controlling brightness of sub pixels of red (R), green (G), and blue (B). Moreover, to describe the color more appropriately, the International Commission on Illumination (CIE) proposes a CIE 1931 XYZ color space (CIE XYZ Color Space). Red, green, and blue are used as three primary colors in the color space. All other colors can be generated by mixing the three primary colors. All colors have X, Y, and Z tri-stimulus values, and different colors are displayed using different proportions of three primary colors.

A liquid crystal display (LCD) is a display device with flat and ultra-thin, is formed of a particular quantity of colorful pixels or white and black pixels, and is disposed in front of a light source or a reflector. The LCD has low power consumption, and becomes mainstream displays for the characteristics of high image quality, a small volume, and a light weight. The LCD has been widely used in various electronic products, for example, computer devices with display screens, mobile phones or digital photo frames. At present, a development priority for the LCD is a wide-viewing angle technology. However, a color shift phenomenon usually occurs in a wide-viewing angle technology LCD when a side viewing angle is excessively large.

As screens of displays are becoming increasingly large, a viewing angle feature of the displays becomes an important indicator for color quality of the displays. Generally speaking, a viewing angle color difference of a Vertical Alignment (VA) LCD is greater than an In-Plane Switching (IPS) LCD because different of birefringence effects of liquid crystals. As a result, a screen of the VA LCD is white when a V-T curve shifts, causing color wash-out in an off-axis case.

Generally, to resolve a problem of an off-axis color difference, one pixel may be divided into two parts to mitigate the off-axis color difference. However, when the resolution is increased, division of the pixel may cause reduced transmittance. Furthermore, the pixel is divided into a main pixel block and a sub pixel block. A voltage greater than that required for normal displaying is provided to the main pixel block, and a voltage less than that required for normal displaying is provided to the sub pixel block. In this way, a purpose of improving a chromatic visible angle is achieved by mixing main pixel blocks and sub pixel blocks. However, a pixel is used as a unit in the foregoing method and a grid is easily formed between main pixel blocks and sub pixel blocks.

SUMMARY

To resolve the foregoing technical problem, this application provides an image processing method of a display to optimize chromatic visible angles of a display. As LCDs are becoming increasingly large, viewing angles are different when a user are at different positions. Even at a particular position, a viewing angle towards a screen includes more than one angle. Generally, a technology using a viewing-angle compensation algorithm may provide color compensation, to provide color compensation for a particular viewing angle. Other viewing angles may be relatively inaccurate. Therefore, this application provides optimized image processing of a display to compensate for viewing-angle features of a plurality of angles, and this application can be used to perform optimal compensation for chromatic visible angles regardless of the size of a display.

The objective of this application is achieved and the technical problem of this application is resolved by using the following technical solution. This application provides a technology using an algorithm to compensate for a chromatic visible angle, comprising:

first, dividing pixels of a picture of a display device into several main pixel blocks and several sub pixel blocks; adjusting several white dot coordinates on the picture of the display device by using a gamma module; obtaining a high-voltage grayscale lookup table by using a high-voltage gamma module and obtaining a low-voltage grayscale lookup table by using a low-voltage gamma module; selecting to output one of the high-voltage grayscale lookup table or the low-voltage grayscale lookup table by using a first selection module according to an arrangement manner of the main pixel blocks and the sub pixel blocks; calculating a color saturation of the picture of the display device by using a color saturation calculation module; and adjusting, by a second selection module, a chromatic visible angle value in the display device according to the color saturation and one of the white dot coordinates, the high-voltage grayscale lookup table or the low-voltage grayscale lookup table.

In the embodiments of this application, the main pixel blocks and the sub pixel blocks are alternately arranged.

In the embodiments of this application, a calculating value of the color saturation is introduced in the following formula by using a pixel as a unit: color saturation $S=\max(R, G, B)-\min(R, G, B)/\max(R, G, B)$.

In the embodiments of this application, the calculating a color saturation of the picture of the display device by using a color saturation calculation module further comprises a color gain module configured to perform gain processing on the color saturation.

In the embodiments of this application, during the adjusting, by a second selection module, a chromatic visible angle value in the display device according to the color saturation and one of the white dot coordinates, the high-voltage grayscale lookup table or the low-voltage grayscale lookup table, the related parameters are introduced in the following formula to calculate the chromatic visible angle value to be adjusted in the display device:

$$\text{data out} = \text{out}A * S\_\text{gain} + \text{out}B * (1 - S\_\text{gain}), \text{ where}$$

outA is one of the high-voltage grayscale lookup table or the low-voltage grayscale lookup table;

S_gain is color saturation with a gain; and outB is several white dot coordinates used to adjust the picture of the display device by using the gamma module.

The objective of this application may further be achieved and the technical problem of this application may further be resolved by using the following technical measure. This application provides an image processing structure, comprising an input module, a gamma module (gamma), a high-voltage gamma module (H_gamma), a low-voltage gamma module (L_gamma), a first selection module, a color saturation calculation module, and a second selection module. The input module is configured to obtain several main pixel blocks and several sub pixel blocks on a picture of a display device. The gamma module (gamma) is configured to adjust several white dot coordinates (outB) on the picture of the display device. The high-voltage gamma module (H_gamma) is configured to obtain a high-voltage grayscale lookup table (H_LUT). The low-voltage gamma module (L_gamma) obtains a low-voltage grayscale lookup table (L_LUT). The first selection module is configured to select to output one (outA) of the high-voltage grayscale lookup table (H_LUT) or the low-voltage grayscale lookup table (L_LUT) according to an arrangement manner of the main pixel blocks and the sub pixel blocks. The color saturation calculation module is configured to calculate color saturation (S) of the picture of the display device. The second selection module is configured to adjust a chromatic visible angle value in the display device according to the color saturation (S) and one (outA) of the white dot coordinates (outB), the high-voltage grayscale lookup table or the low-voltage grayscale lookup table.

In the embodiments of this application, a calculating value of the color saturation is introduced in the following formula by using a pixel as a unit: color saturation S=max(R, G, B)−min(R, G, B)/max(R, G, B).

In the embodiments of this application, the method further comprises a color gain module configured to process the color saturation (S) to output color saturation with gain (S_gain).

In the embodiments of this application, the chromatic visible angle value is:

data out=out$A$*S_gain+out$B$*(1−S_gain), where outA is one of the high-voltage grayscale lookup table or the low-voltage grayscale lookup table;

S_gain is color saturation with a gain; and outB is several white dot coordinates used to adjust the picture of the display device by using the gamma module.

The objective of this application may still further be achieved and the technical problem of this application may still further be resolved by using the following technical measure. This application provides a display device, comprising a display panel, where the display panel comprises a plurality of pixels configured to display an image, and comprising the foregoing image processing structure.

This application provides an optimized image processing technology to compensate for viewing-angle features of a plurality of angles, and this application can obtain an optimal chromatic visible angle value regardless of the size of a display.

DETAILED DESCRIPTION

The following embodiments are described with reference to the accompanying drawings, used to exemplify specific embodiments for implementation of this application. Terms about directions mentioned in this application, such as "on", "below", "front", "back", "left", "right", "in", "out", and "side surface" merely refer to directions in the accompanying drawings. Therefore, the used terms about directions are used to describe and understand this application, and are not intended to limit this application.

The accompanying drawings and the description are considered to be essentially exemplary, rather than limitative. In the figures, modules with similar structures are represented by using the same reference number. In addition, for understanding and ease of description, the size and the thickness of each component shown in the accompanying drawings are arbitrarily shown, but this application is not limited thereto.

In addition, throughout this specification, unless otherwise explicitly described to have an opposite meaning, the word "include" is understood as including the component, but not excluding any other component. In addition, throughout this specification, "on" means that one is located above or below a target component and does not necessarily mean that one is located on the top based on a gravity direction.

To further describe the technical means used in this application to achieve the application objective and effects thereof, specific implementations, structures, features, and effects of a display device provided according to this application are described in detail below with reference to the drawings and preferred embodiments.

Figure 1:
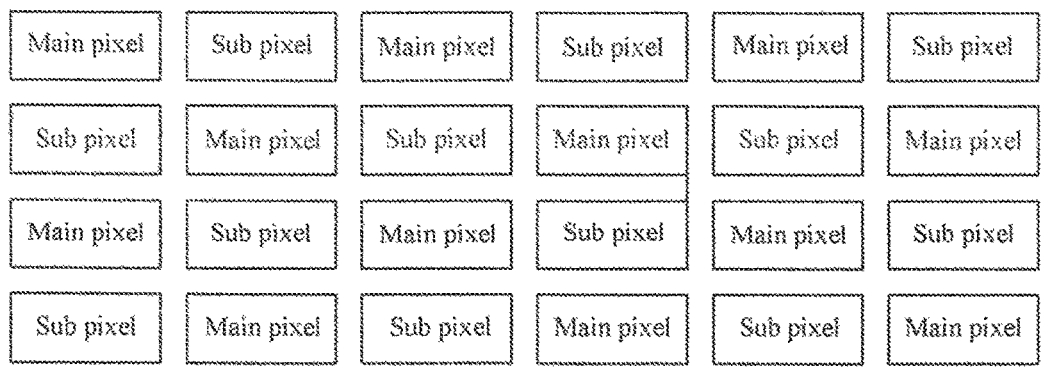
FIG. 1 is a schematic diagram of pixels of a picture of a display device being divided into several main pixel blocks and several sub pixel blocks according to an embodiment of this application.

FIG. 1 is a schematic diagram of pixels of a picture of a display device being divided into several main pixel blocks and several sub pixel blocks according to an embodiment of this application. FIG. 1 shows the basic concept of this application. A pixel is divided into a main pixel block and a sub pixel block. A voltage greater than that required for normal displaying is provided to the main pixel block, and a voltage less than that required for normal displaying is provided to the sub pixel block. In this way, a purpose of improving a chromatic visible angle is achieved by mixing main pixel blocks and sub pixel blocks. However, a pixel is used as a unit in the foregoing method and a grid is easily formed between main pixel blocks and sub pixel blocks. This application mainly resolves a grid problem by optimization.

In this embodiment, the CIE proposes a CIE 1931 XYZ color space (CIE XYZ Color Space) with reference to a tri-stimulus value. Red (R), green (G), and blue (B) used as three primary colors in the color space. All other colors can be generated by mixing the three primary colors Red (R), green (G), and blue (B). The CIE 1931 XYZ color space is usually represented by a CIE 1931 chromaticity diagram. The CIE 1931 chromaticity diagram has three parameters, in which a stimulus value Y represents brightness.

Figure 2:
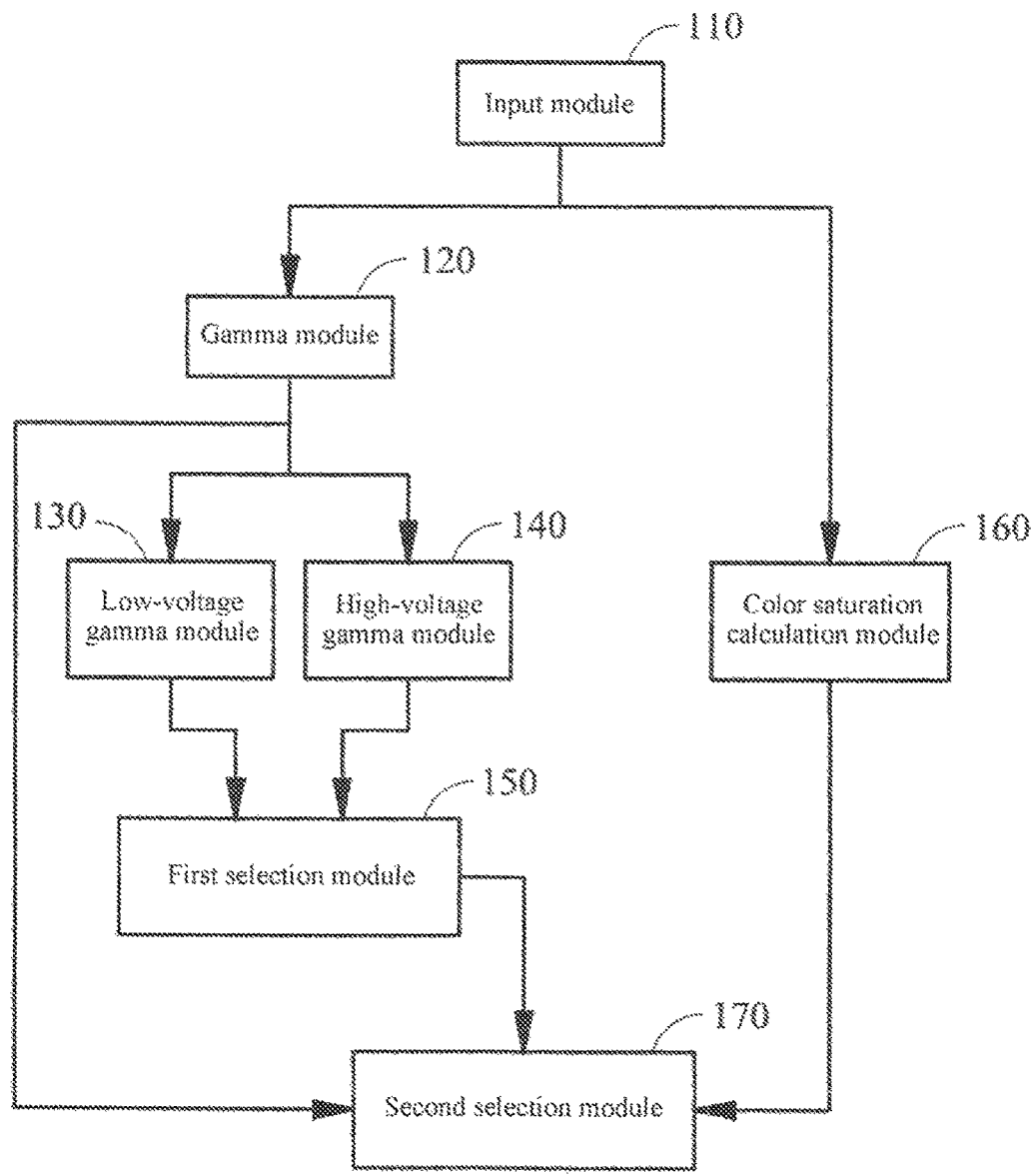
FIG. 2 is a schematic diagram of an image processing structure according to an embodiment of this application.

FIG. 2 is a schematic diagram of an image processing structure according to an embodiment of this application. As shown in FIG. 2, an image processing structure includes an input module 110, a gamma module (gamma) 120, a low-voltage gamma module (L_gamma) 130, a high-voltage gamma module (H_gamma) 140, a first selection module 150, a color saturation calculation module 160, and a second selection module 170.

The input module 110 is configured to obtain several main pixel blocks and several sub pixel blocks on a picture of a display device. The gamma module 120 is configured to adjust several white dot coordinates (outB) on the picture of the display device. The low-voltage gamma module 130 is configured to obtain a low-voltage grayscale lookup table (L_LUT). The high-voltage gamma module (H_gamma) 140 is configured to obtain a high-voltage grayscale lookup table (H_LUT). The first selection module 150 is configured to select to output one (outA) of the high-voltage grayscale lookup table (H_LUT) or the low-voltage grayscale lookup table (L_LUT) according to an arrangement manner of the main pixel blocks and the sub pixel blocks. The color saturation calculation module 160 is configured to calculate color saturation (S) of the picture of the display device. The second selection module 170 is configured to adjust a chromatic visible angle value in the display device according to the color saturation (S) and one (outA) of the white dot coordinates (outB), the high-voltage grayscale lookup table or the low-voltage grayscale lookup table.

In this embodiment, a calculating value of the color saturation is introduced in the following formula by using a pixel as a unit: color saturation S=max(R, G, B)−min(R, G, B)/max(R, G, B).

In this embodiment, the method further comprises a color gain module configured to perform process the color saturation (S) to output color saturation with a gain (S_gain).

In this embodiment, the chromatic visible angle value is:

$$\text{data out}=\text{out}A*S\_gain+\text{out}B*(1-S\_gain), \text{ where}$$

outA is one of the high-voltage grayscale lookup table or the low-voltage grayscale lookup table;

S_gain is color saturation with a gain; and outB is several white dot coordinates used to adjust the picture of the display device by using the gamma module.

Figure 3:
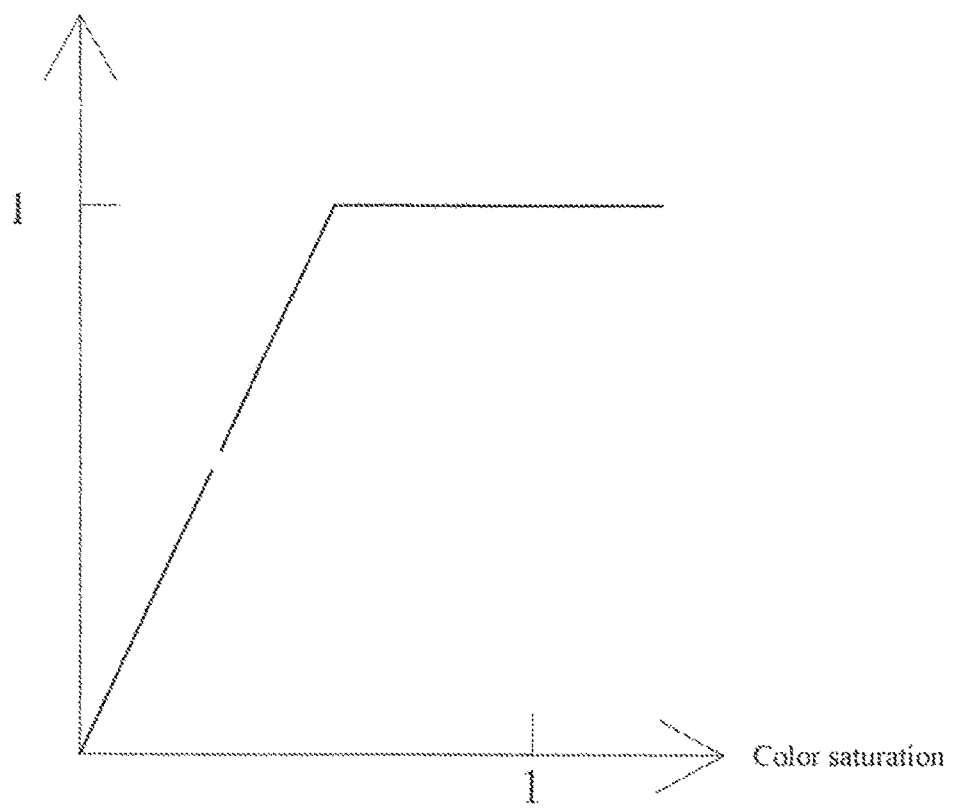
FIG. 3 is a schematic diagram of a lookup table of color saturation (S)—color saturation with a gain (S_gain) according to an embodiment of this application.

FIG. 3 is a schematic diagram of a lookup table of color saturation (S)-color saturation with a gain (S_gain) according to an embodiment of this application. As shown in FIG. 3, an S-S_gain curve about a correspondence between the color saturation (S) and the color saturation with a gain (S_gain) is listed. The curve is generally used as an editable lookup table inside a chip, and the curve may be arbitrarily edited according to actual needs.

The processing manners in FIG. 2 and FIG. 3 have the following advantages:

1. When the color saturation (S) of an input image is very low, the color saturation with a gain (S_gain) approximates zero. The second selection module 170 selects the gamma module (gamma) to adjust the several white dot coordinates (outB) on the picture of the display device. That is, data is directly output after being processed by the gamma module. The data is not processed by the high-voltage gamma module (H_gamma) 140 and the low-voltage gamma module (L_gamma) 130, and a grid is not formed.

2. When the saturation of an input image is high, the color saturation with a gain (S_gain) approximates 1. The second selection module 170 selects one (outA) of the high-voltage grayscale lookup table or the low-voltage grayscale lookup table. That is, data is output after being processed by the high-voltage gamma module (H_gamma) 140 and the low-voltage gamma module (L_gamma) 130, so as to improve a chromatic visible angle.

Based on the foregoing method, it can be implemented that: when the chrominance is high, the chromatic visible angle may be improved by using the high-voltage gamma module (H_gamma) 140 and the low-voltage gamma module (L_gamma) 130. When the chrominance is zero, data is directly output from the gamma module 120 to ensure that there is no grid in a pure grayscale image.

Figure 4:
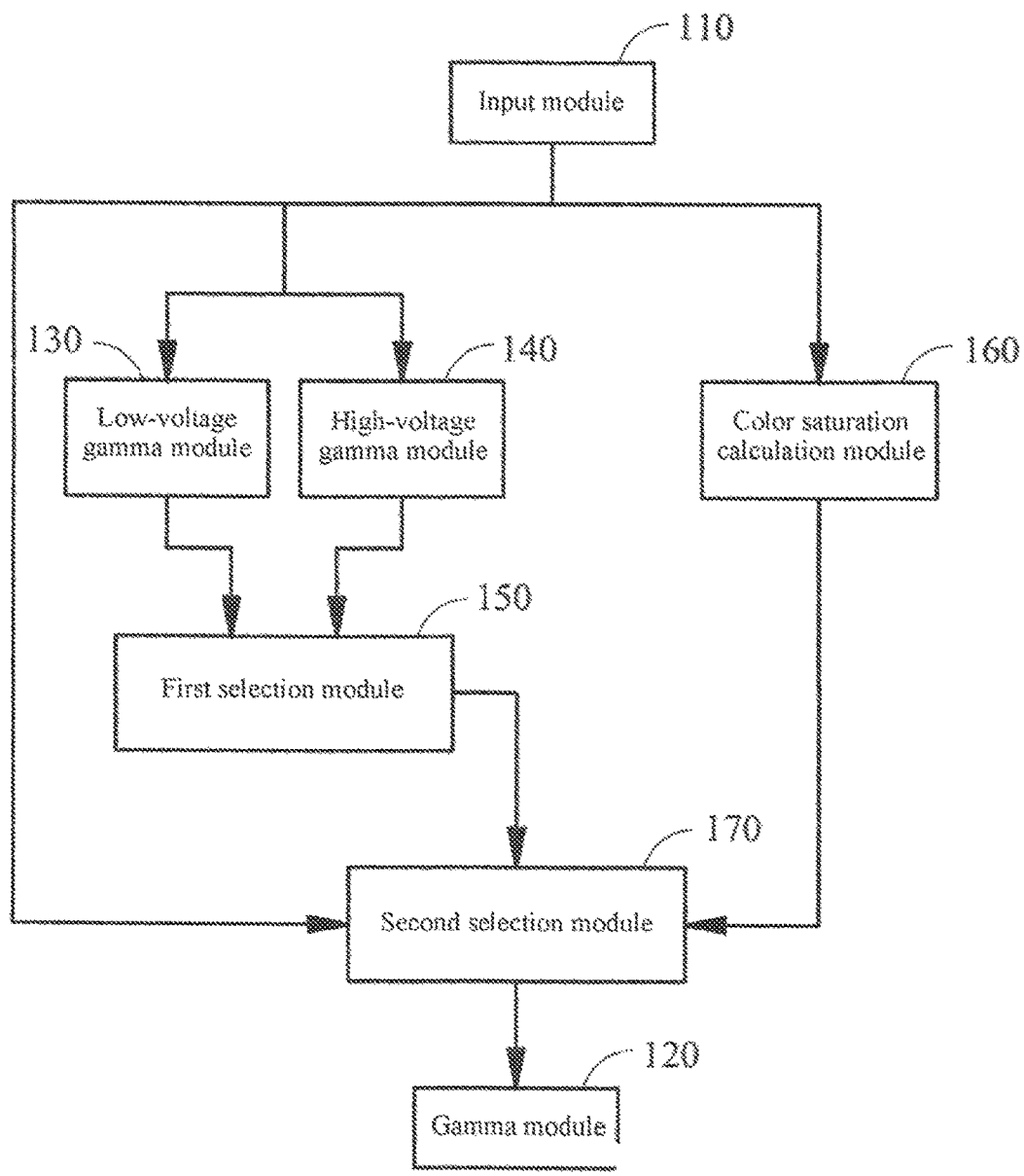
FIG. 4 is a schematic diagram of another image processing structure according to an embodiment of this application.

FIG. 4 is a schematic diagram of another image processing structure according to an embodiment of this application. As shown in FIG. 4, an image processing structure includes an input module 110, a gamma module (gamma) 120, a low-voltage gamma module (L_gamma) 130, a high-voltage gamma module (H_gamma) 140, a first selection module 150, a color saturation calculation module 160, and a second selection module 170. The input module 110 is configured to obtain several main pixel blocks and several sub pixel blocks on a picture of a display device. The gamma module (gamma) 120 is configured to adjust several white dot coordinates (outB) on the picture of the display device. The low-voltage gamma module (L_gamma) 130 is configured to obtain a low-voltage grayscale lookup table (L_LUT). The high-voltage gamma module (H_gamma) 140 obtains a high-voltage grayscale lookup table (H_LUT). The first selection module 150 is configured to select to output one (outA) of the high-voltage grayscale lookup table (H_LUT) or the low-voltage grayscale lookup table (L_LUT) according to an arrangement manner of the main pixel blocks and the sub pixel blocks. The color saturation calculation module 160 is configured to calculate color saturation (S) of the picture of the display device. The second selection module 170 is configured to adjust a chromatic visible angle value in the display device according to the color saturation (S) and one (outA) of the white dot coordinates (outB), the high-voltage grayscale lookup table or the low-voltage grayscale lookup table.

In this embodiment, compared with FIG. 2, there is a structural difference. In FIG. 2, the gamma module (gamma) 120 directly processes the several white dot coordinates (outB) on a picture of the display device. In FIG. 4, the gamma module (gamma) 120 adjusts the second selection module 170 to adjust the chromatic visible angle value in the display device according to the color saturation (S) and one (outA) of the white dot coordinates (outB) of the unprocessed original image, the high-voltage grayscale lookup table or the low-voltage grayscale lookup table.

Figure 5:
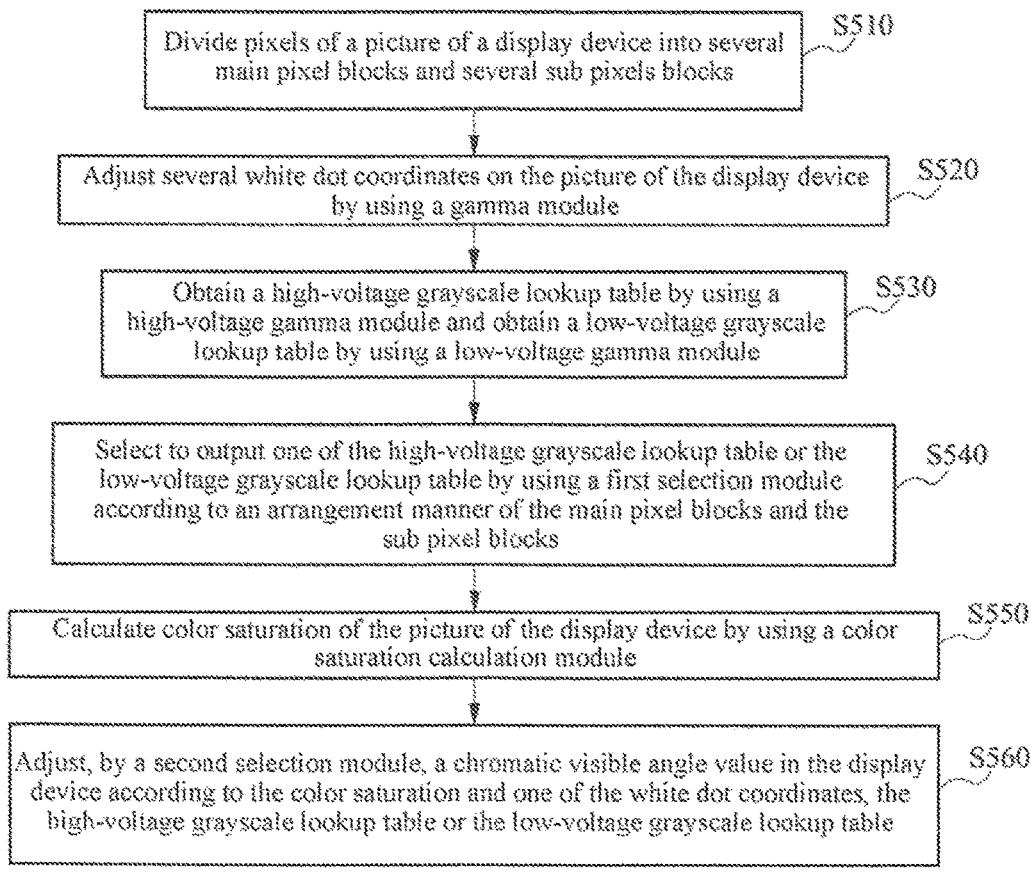
FIG. 5 is a flowchart of describing an image processing method of a display device according to an embodiment of this application.

FIG. 5 is a flowchart of describing an image processing method of a display device according to an embodiment of this application. Refer to the following specification:

Step S510: Divide pixels of a picture of a display device into several main pixel blocks and several sub pixel blocks.

In this embodiment, the main pixel blocks and the sub pixel blocks are alternately arranged.

Step S520: Adjust several white dot coordinates on the picture of the display device by using a gamma module (gamma).

Step S530: Obtain a high-voltage grayscale lookup table (H_LUT) by using a high-voltage gamma module (H_gamma) and obtain a low-voltage grayscale lookup table (L_LUT) by using a low-voltage gamma module (L_gamma).

Step S540: Select to output one of the high-voltage grayscale lookup table or the low-voltage grayscale lookup table by using a first selection module according to an arrangement manner of the main pixel blocks and the sub pixel blocks.

In this embodiment, the high-voltage grayscale lookup table (H_LUT) or the low-voltage grayscale lookup table (L_LUT) is selected according to the arrangement manner main pixel blocks and the sub pixel blocks. The high-voltage grayscale lookup table is selected for main pixel blocks, and the low-voltage grayscale lookup table is selected for sub pixel blocks.

Step S550: Calculate color saturation of the picture of the display device by using a color saturation calculation module.

In this embodiment, a calculating value of the color saturation is introduced in the following formula by using a pixel as a unit: color saturation S=max(R, G, B)−min(R, G, B)/max(R, G, B).

In the embodiments of this application, the method further comprises a color gain module configured to process the color saturation (S) to output color saturation with a gain (S_gain).

Step S560: Adjust, by a second selection module, a chromatic visible angle value in the display device according to the color saturation and one of the white dot coordinates, the high-voltage grayscale lookup table or the low-voltage grayscale lookup table.

The chromatic visible angle value is:

$$\text{data out}=\text{out}A * S\_gain + \text{out}B * (1-S\_gain), \text{ where}$$

outA is one of the high-voltage grayscale lookup table or the low-voltage grayscale lookup table;

S_gain is color saturation with a gain; and outB is several white dot coordinates used to adjust the picture of the display device by using the gamma module.

An embodiment of this application further provides a display device, including a display panel, where the display panel includes a plurality of pixels configured to display an image, and including the foregoing image processing structure.

To sum up, this application provides an image processing method of a display to optimize viewing-angle features of a display device. As LCDs are becoming increasingly large, viewing angles are different when a user are at different positions. Even at a particular position, a viewing angle towards a screen includes more than one angle. Generally, a technology using a viewing-angle compensation algorithm may provide color compensation, to provide color compensation for a particular viewing angle. Other viewing angles may be relatively inaccurate. Therefore, this application provides an optimized viewing angle compensation technology to compensate for viewing-angle features of a plurality of angles, and this application can obtain optimal chromatic visible angle value regardless of the size of a display.

The terms such as "in some embodiments" and "in various embodiments" are repeatedly used. The terms usually refer to different embodiments, but they may also refer to a same embodiment. The words, such as "comprise", "have", and "include", are synonyms, unless other meanings are indicated in the context thereof.

Descriptions above are merely preferred embodiments of this application, and are not intended to limit this application in any form. Although this application has been disclosed above in forms of preferred embodiments, the embodiments are not intended to limit this application. A person skilled in the art can make some equivalent variations, alterations or modifications to the above disclosed technical content without departing from the scope of the technical solutions of the above disclosed technical content to obtain equivalent embodiments. Any simple alteration, equivalent change or modification made to the foregoing embodiments according to the technical essence of this application without departing from the content of the technical solutions of this application shall fall within the scope of the technical solutions of this application.

What is claimed is:

1. An image processing method of a display device, comprising:
    dividing pixels of a picture of a display device into several main pixel blocks and several sub pixel blocks;
    adjusting several white dot coordinates on the picture of the display device by using a gamma module;
    obtaining a high-voltage grayscale lookup table by using a high-voltage gamma module and obtaining a low-voltage grayscale lookup table by using a low-voltage gamma module;
    selecting to output one of the high-voltage grayscale lookup table or the low-voltage grayscale lookup table by using a first selection module according to an arrangement manner of the main pixel blocks and the sub pixel blocks;
    calculating a color saturation of the picture of the display device by using a color saturation calculation module; and
    adjusting, by a second selection module, a chromatic visible angle value in the display device according to the color saturation and one of the white dot coordinates, the high-voltage grayscale lookup table or the low-voltage grayscale lookup table.

2. The image processing method of a display device according to claim 1, wherein the main pixel blocks and the sub pixel blocks are alternately arranged.

3. The image processing method of a display device according to claim 1, wherein a calculating value of the color saturation is introduced in the following formula by using a pixel as a unit:

$$\text{color saturation } S=\max(R,G,B)-\min(R,G,B)/\max(R,G,B).$$

4. The image processing method of a display device according to claim 1, further comprising a color gain module configured to perform gain processing on the color saturation.

5. The image processing method of a display device according to claim 1, wherein during the adjusting, by a second selection module, a chromatic visible angle value in the display device according to the color saturation and one of the white dot coordinates, the high-voltage grayscale lookup table or the low-voltage grayscale lookup table, the related parameters are introduced in the following formula to calculate the chromatic visible angle value to be adjusted in the display device:

$$\text{data out}=\text{out}A * S\_gain + \text{out}B * (1-S\_gain), \text{ wherein}$$

outA is one of the high-voltage grayscale lookup table or the low-voltage grayscale lookup table;

S_gain is color saturation with a gain; and outB is several white dot coordinates used to adjust the picture of the display device by using the gamma module.

6. An image processing structure, comprising:
    an input module, configured to obtain several main pixel blocks and several sub pixel blocks on a picture of a display device;
    a gamma module, configured to adjust several white dot coordinates on the picture of the display device;
    a high-voltage gamma module, configured to obtain a high-voltage grayscale lookup table;

a low-voltage gamma module, configured to obtain a low-voltage grayscale lookup table;

a first selection module, configured to select to output one of the high-voltage grayscale lookup table or the low-voltage grayscale lookup table according to an arrangement manner of the main pixel blocks and the sub pixel blocks;

a color saturation calculation module, configured to calculate color saturation of the picture of the display device; and a second selection module, configured to adjust a chromatic visible angle value in the display device according to the color saturation and one of the white dot coordinates, the high-voltage grayscale lookup table or the low-voltage grayscale lookup table.

7. The image processing structure according to claim 6, wherein a calculating value of the color saturation is introduced in the following formula by using a pixel as a unit:

color saturation $S=\max(R,G,B)-\min(R,G,B)/\max(R,G,B)$.

8. The image processing structure according to claim 6, further comprising a color gain module configured to perform gain processing on the color saturation.

9. The image processing structure according to claim 6, wherein the chromatic visible angle value is:

data out=out$A$*S_gain+out$B$*(1−S_gain), wherein outA is one of the high-voltage grayscale lookup table or the low-voltage grayscale lookup table;

S_gain is color saturation with a gain; and outB is several white dot coordinates used to adjust the picture of the display device by using the gamma module.

10. The image processing structure according to claim 6, wherein the main pixel blocks and the sub pixel blocks are alternately arranged.

11. A display device, comprising a display panel, wherein the display panel comprises a plurality of pixels configured to display an image, and comprising an image processing structure, wherein the image processing structure comprises:

an input module, configured to obtain several main pixel blocks and several sub pixel blocks on a picture of the display device;

a gamma module, configured to adjust several white dot coordinates on the picture of the display device;

a high-voltage gamma module, configured to obtain a high-voltage grayscale lookup table;

a low-voltage gamma module, configured to obtain a low-voltage grayscale lookup table;

a first selection module, configured to select to output one of the high-voltage grayscale lookup table or the low-voltage grayscale lookup table according to an arrangement manner of the main pixel blocks and the sub pixel blocks;

a color saturation calculation module, configured to calculate color saturation of the picture of the display device; and a second selection module, configured to adjust a chromatic visible angle value in the display device according to the color saturation and one of the white dot coordinates, the high-voltage grayscale lookup table or the low-voltage grayscale lookup table.

12. The display device according to claim 11, wherein the main pixel blocks and the sub pixel blocks are alternately arranged.

13. The display device according to claim 11, wherein a calculating value of the color saturation is introduced in the following formula by using a pixel as a unit:

color saturation $S=\max(R,G,B)-\min(R,G,B)/\max(R,G,B)$.

14. The display device according to claim 11, further comprising a color gain module configured to perform gain processing on the color saturation.

15. The display device according to claim 11, wherein the chromatic visible angle value is:

data out=out$A$*S_gain+out$B$*(1−S_gain), wherein outA is one of the high-voltage grayscale lookup table or the low-voltage grayscale lookup table;

S_gain is color saturation with a gain; and outB is several white dot coordinates used to adjust the picture of the display device by using the gamma module.

* * * * *